5999X
S. Nisbet.
Plow.
Patented May 25, 1830.
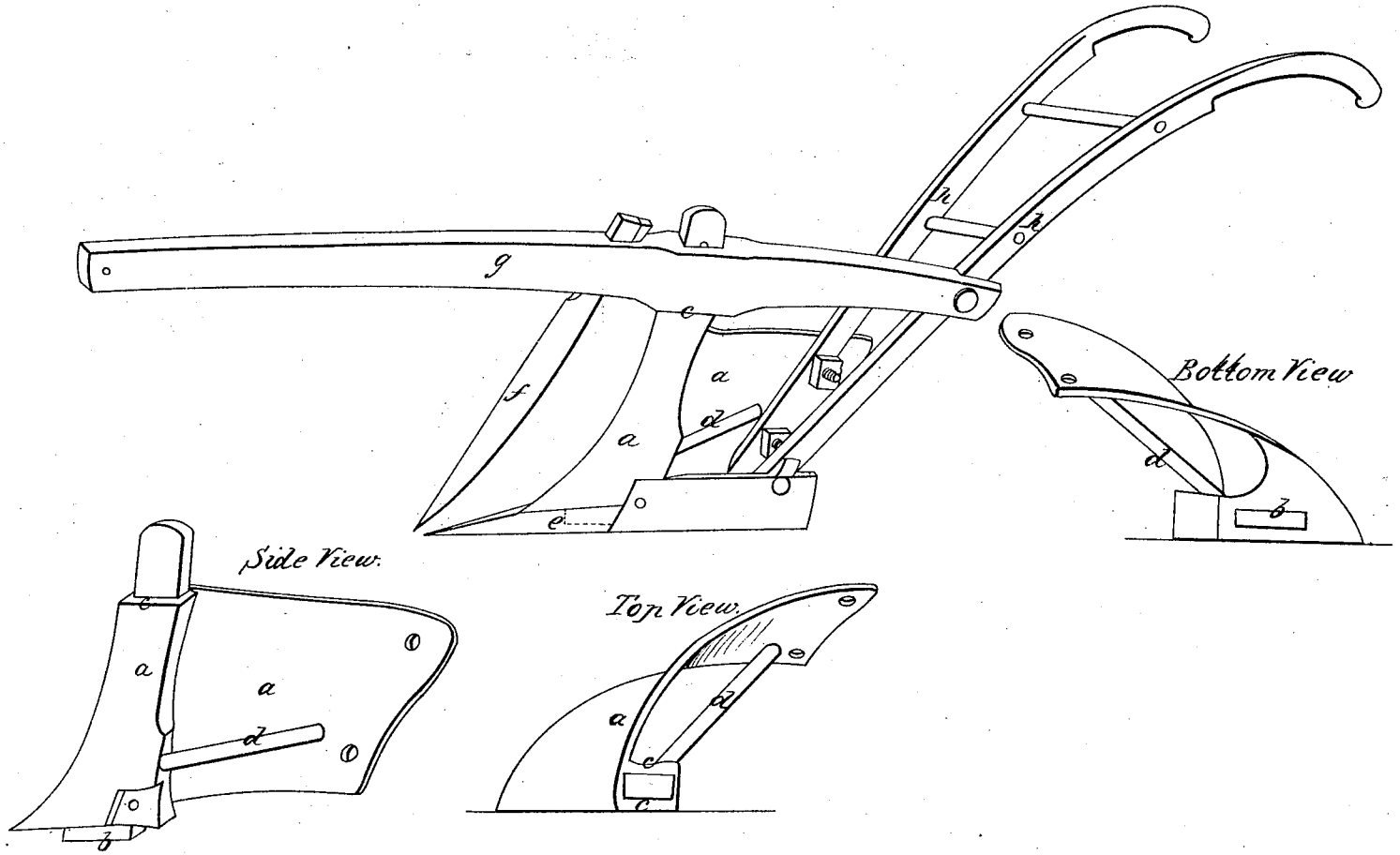
N. PETERS, PHOTO-LITHOGRAPHER, WASHINGTON D. C.

5999X

United States Patent Office.

SAMUEL NISBET, OF TOBOYNE TOWNSHIP, PERRY COUNTY, PENNSYLVANIA.

IMPROVEMENT IN PLOWS.

Specification forming part of Letters Patent dated May 25, 1830.

*To all whom it may concern:*

Be it known that I, SAMUEL NISBET, of Toboyne township, Perry county, State of Pennsylvania, have invented an Improvement in Plows, of which the following is a specification.

This plow consists of the following principal parts, viz: first, the mold-board and sheth; second, the wrought-iron share; third, the colter; fourth, the beam and handles.

First. The mold-board and sheth are made of cast-iron and cast together solid. There is a tenon in the lower part of the sheth, that sets into the socket of the share. The sheth or mold-board extends up through the beam, and has two projections cast on it, one on each side, on which the beam rests. A bar extends from the sheth on the land side to the mold-board on the inner side, which acts as a stay and support to both the sheth and mold-board, and is cast solid with them.

Second. The share is made of wrought-iron, and is of the common form and size.

Third. The colter is made of wrought-iron and of the common shape and size.

Fourth. The beam and handles are made of wood and of the common shape and size.

What I claim as my invention is—

The construction of the mold-board and sheth, as before described.

For a further illustration of my invention I refer to the model and drawing of the same deposited in the Patent Office.

In testimony that the foregoing is a true description of my invention I have subscribed my name hereunto before two witnesses, and made oath to the same at the city of Washington, this 15th day of May, 1830.

SAMUEL NISBET.

Witnesses:

WM. RAMSEY,
W. P. ELLIOT.